Aug. 21, 1934.                C. F. ARNOLD                1,970,724
                          FUEL TANK CONSTRUCTION
                            Filed Feb. 2, 1933
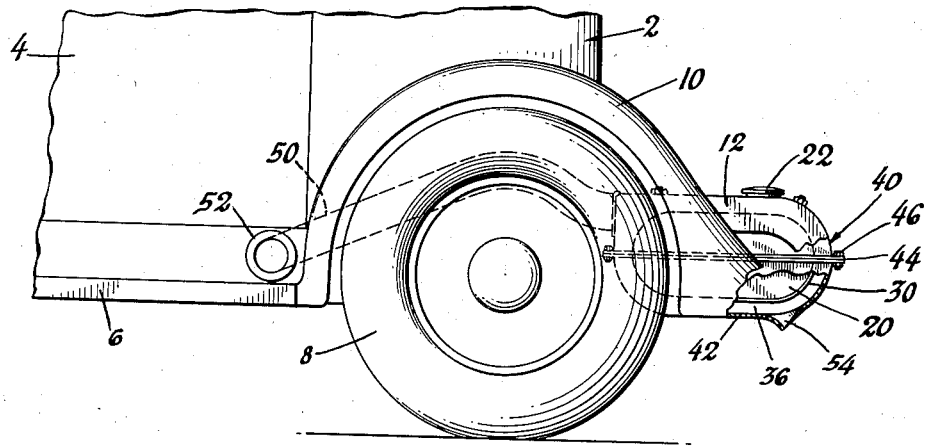
Fig. 1
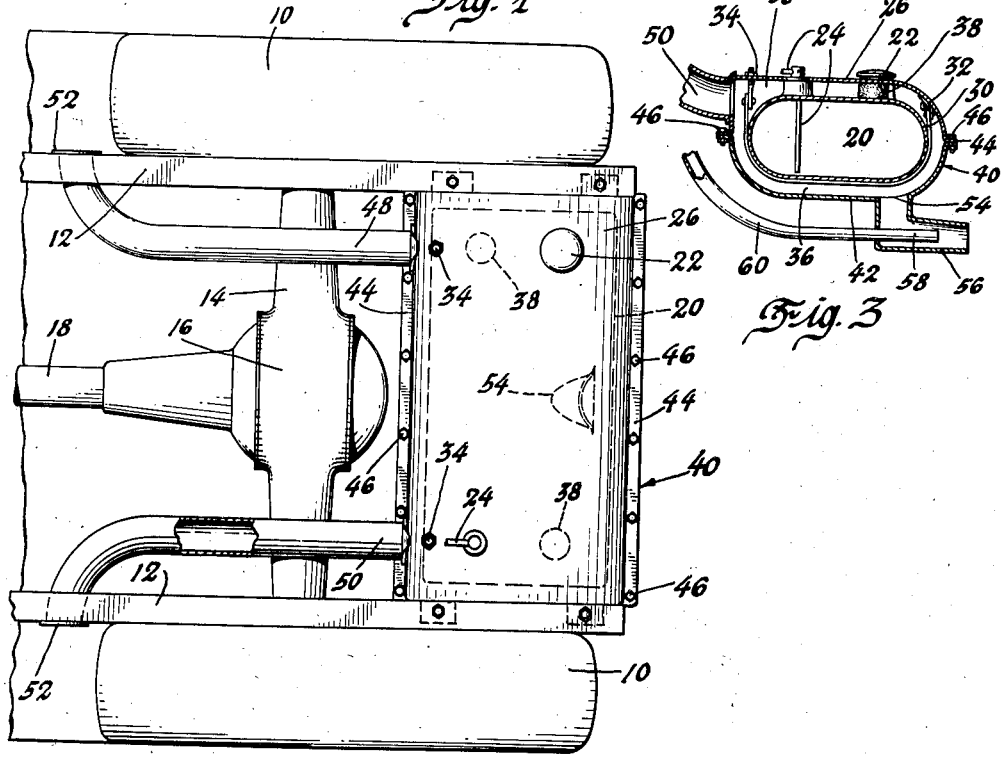
Fig. 2
Fig. 3
Inventor
Charles F. Arnold
By Blackmore, Spencer & Flint
Attorneys

UNITED STATES PATENT OFFICE 1,970,724

FUEL TANK CONSTRUCTION

Charles F. Arnold, Detroit, Mich., assignor to General Motors Corporation, Detroit, Mich., a corporation of Delaware Application February 2, 1933, Serial No. 654,853

2 Claims. (Cl. 280—5)

This invention relates to automotive vehicles and has particular reference to a structure for shielding and ventilating the fuel tank to maintain the tank and its contents in a cool condition.

The object of the invention is accomplished by surrounding the tank with an enclosure which is spaced from the tank by suitable spacers to form an air chamber or passage entirely around the gasoline tank. Two pipes are joined to the chamber and extend forwardly thereof to any suitable part of the vehicle so that they may receive air when the vehicle is in motion and cause the air to circulate through the air space around the tank. An opening at the rear bottom portion of the enclosure acts as an outlet to deliver the air passing around the tank to the rear of the vehicle.

In a modified form of the invention the end of the exhaust pipe is positioned in the outlet opening of the enclosure so that the passage of exhaust gases from the end of the exhaust pipe will withdraw air from the air space.

On the drawing Figure 1 is a view in side elevation of the rear portion of an automotive vehicle showing the invention applied. Parts are broken away and shown in section better to illustrate the construction.

Figure 2 is a plan view of the structure of Figure 1 with the vehicle body removed.

Figure 3 is a sectional view of a modification.

Referring to the drawing the numeral 2 indicates an automotive vehicle having the door 4, a running board 6, the wheels 8, the fender 10 and chassis side bars 12. The rear axle is indicated at 14, the differential housing at 16 and the propeller shaft at 18. These parts are conventional, and per se form no part of the invention.

The gasoline tank of the invention is indicated at 20 and has the usual filling neck closed by the removable cap 22. The fuel line at 24 leads to the carburetor of the engine. The fuel tank 20 may be supported from the chassis side bars 12 in the usual way, but in the present invention it is preferred to support the tank from the top plate 26 by means of supporting irons 30. The irons 30 are hinged at 32 to the interior of the plate 26 at the rear thereof and at their other ends pass through openings in the cover 26 and are secured by nuts 34. As many irons 30 as desired may be used, in the present instance only two being shown.

In order to form an air space or chamber 36 between the top of the gasoline tank 20 and the top 26 of the cover suitable spacers 38 of rubber, wood, or other insulating material are used. The top 26 forms the upper half of an enclosure indicated as a whole at 40, the bottom half thereof being indicated by the numeral 42. The two sections 26 and 42 of the enclosure 40 are secured together by means of flanges 44 and bolts 46. The ends of the sections 26 and 42 are rigidly secured to the chassis side bars 12 rigidly to mount the gasoline tank relative to the vehicle.

As best shown in Figures 1 and 3, the bottom section 42 of the enclosure is also spaced from the gasoline tank 20 so that the air space 36 extends entirely around the tank.

At the front end of the tank there are secured the two pipes 48 and 50 which extend forwardly and open to the atmosphere immediately in front of the fender 10 as shown at 52. These pipes will be able to receive air and lead it to the space 36 around the gasoline tank to keep the tank cool. The mouth or entrance 52 of the pipes 48 and 50 may be at any suitable place on the vehicle, the position in front of the fender 10 being shown merely by way of illustration.

In order to allow the air to escape from the space 36 an outlet or opening 54 is provided at the bottom rear portion of the enclosure 40. The air entering from the pipes 50 into the space 36 will leave the enclosure 40 at the opening 54.

In Figure 3 I have shown a modified form of structure beyond the opening 54. The modification consists in the provision of an L-shaped pipe 56 in the center of one leg of which there is positioned the end 58 of the exhaust pipe 60. The passage of exhaust gases from the end 58 will pull air through the pipes 50 and space 36 additionally to cool the gasoline tank 20.

I claim:

1. In combination with an automotive vehicle having a chassis frame and a fuel tank, an enclosure for the fuel tank spaced therefrom to define an air space, said enclosure secured to the chassis frame between the side bars thereof, an open pipe leading to the enclosure from a point in advance of the tank to cause air to pass through the space to cool the tank when the vehicle is in motion.

2. In combination with an automotive vehicle having a chassis frame, a fuel tank and an exhaust pipe, an enclosure for the fuel tank spaced therefrom to define an air space, said enclosure secured to the chassis frame between the side bars thereof means to cause air to pass into the space to cool the tank when the vehicle is in motion, and an outlet from the air space surrounding the exit of the exhaust pipe to withdraw air from the space.

CHARLES F. ARNOLD.